US008484733B2

(12) United States Patent
Pirzada et al.

(10) Patent No.: US 8,484,733 B2
(45) Date of Patent: Jul. 9, 2013

(54) MESSAGING SECURITY DEVICE

(75) Inventors: Shamim Pirzada, San Jose, CA (US); Anup Rao, San Jose, CA (US); Michael Thomas, San Francisco, CA (US); James L. Fenton, Los Altos, CA (US); Bailey G. Szeto, San Jose, CA (US); Sanjay Pol, Palo Alto, CA (US); Ashok Ramaswami, Pleasant Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1461 days.

(21) Appl. No.: 11/563,730

(22) Filed: Nov. 28, 2006

(65) Prior Publication Data
US 2008/0127295 A1    May 29, 2008

(51) Int. Cl.
*G06F 11/00* (2006.01)

(52) U.S. Cl.
USPC ............................... 726/23; 726/22

(58) Field of Classification Search
USPC ............. 726/11, 13–15, 22–25; 709/223–225
See application file for complete search history.

(56) References Cited

U.S. PATENT DOCUMENTS

| 6,154,775 | A * | 11/2000 | Coss et al. | 709/225 |
|---|---|---|---|---|
| 6,886,102 | B1 * | 4/2005 | Lyle | 726/23 |
| 6,971,028 | B1 * | 11/2005 | Lyle et al. | 726/25 |
| 7,120,931 | B1 * | 10/2006 | Cheriton | 726/13 |
| 7,302,705 | B1 * | 11/2007 | Boivie | 726/22 |
| 7,444,403 | B1 * | 10/2008 | Packer et al. | 709/224 |
| 7,672,998 | B1 * | 3/2010 | Haskins et al. | 709/206 |
| 7,735,116 | B1 * | 6/2010 | Gauvin | 726/2 |
| 8,176,553 | B1 * | 5/2012 | Magdych et al. | 726/23 |
| 2001/0052014 | A1 * | 12/2001 | Sheymov et al. | 709/225 |
| 2003/0070087 | A1 * | 4/2003 | Gryaznov | 713/201 |
| 2003/0149766 | A1 * | 8/2003 | Syvanne et al. | 709/224 |
| 2004/0093521 | A1 * | 5/2004 | Hamadeh et al. | 713/201 |
| 2004/0098618 | A1 * | 5/2004 | Kim et al. | 713/201 |
| 2004/0205360 | A1 * | 10/2004 | Norton et al. | 713/201 |
| 2004/0215976 | A1 * | 10/2004 | Jain | 713/201 |
| 2004/0250112 | A1 * | 12/2004 | Valente et al. | 713/200 |
| 2005/0046584 | A1 | 3/2005 | Breed | |
| 2005/0050334 | A1 * | 3/2005 | Liang et al. | 713/188 |

(Continued)

FOREIGN PATENT DOCUMENTS

WO    WO-08127436 A1    10/2008

OTHER PUBLICATIONS

Wu, Yu-Sung et al, "SCIDIVE: A Stateful and Cross Protocol Intrusion Detection Architecture for Voice-over-IP Environments," in DSN '04, Proceedings of the 2004 International Conference on Dependable Systems and Networks. Washington, DC, USA: IEEE Computer Society, 2004.*

(Continued)

*Primary Examiner* — Darren B Schwartz
(74) *Attorney, Agent, or Firm* — Schwegman, Lundberg & Woessner, P.A.

(57) ABSTRACT

In one embodiment, a system can comprise an interface that receives data related to a communication session and a messaging security device component that evaluates the data and enables a security measure for preventative monitoring of a threat based on the evaluation, the security measure can be universally applied to two or more messaging formats.

29 Claims, 12 Drawing Sheets

U.S. PATENT DOCUMENTS

| | | | |
|---|---|---|---|
| 2005/0060582 A1* | 3/2005 | Choi et al. ................ 713/201 |
| 2005/0193429 A1* | 9/2005 | Demopoulos et al. ......... 726/23 |
| 2005/0210533 A1* | 9/2005 | Copeland et al. ............. 726/23 |
| 2005/0246193 A1 | 11/2005 | Roever et al. |
| 2005/0278779 A1* | 12/2005 | Koppol et al. ................. 726/22 |
| 2006/0004896 A1* | 1/2006 | Nelson et al. ................ 707/206 |
| 2006/0075497 A1* | 4/2006 | Garg et al. .................... 726/23 |
| 2006/0101021 A1* | 5/2006 | Davis et al. ...................... 707/9 |
| 2006/0253903 A1* | 11/2006 | Krumel ........................... 726/13 |
| 2006/0272018 A1* | 11/2006 | Fouant ............................ 726/23 |
| 2006/0285495 A1* | 12/2006 | Aitken et al. ................. 370/235 |
| 2007/0039040 A1* | 2/2007 | McRae et al. .................... 726/4 |
| 2007/0070921 A1* | 3/2007 | Quinlan et al. ............... 370/254 |
| 2007/0107059 A1* | 5/2007 | Chasin et al. .................. 726/23 |
| 2011/0030054 A1* | 2/2011 | Spatscheck et al. ............ 726/22 |

OTHER PUBLICATIONS

Aggarwal, S. et al. "Anti-cyberstalking: the Predator and Prey Alert (PAPA) system," Nov. 7-9, 2005, Proceedings of the First International Workshop on Systematic Approaches to Digital Forensic Engineering (SADFE'05), pp. 195-205.*

Tech Target. Defending mobile devices from viruses, spyware and malware. 2007. http://www.computerweekly.com/Articles/2007/03119/222505/defending-mobile-devices-from-viruses-spyware-and-malware.htm.

BorderWare Technologies. Security for Converged Email, Instant Messaging, VoIP and Web—to Meet Regulatory Compliance. http://www.technology-reports.com/report.asp?id=683. Last accessed Apr. 27, 2007.

Jack M. Germain. Akonix Debuts Instant-Messaging Security Appliance. Aug. 17, 2005. http://www.sci-techtoday.com/news/Akonix-Debuts-IM-Security-Appliance/story.xhtml?story_id=10100B9YJJ03.

* cited by examiner

MESSAGING SECURITY DEVICE

TECHNICAL FIELD

The subject disclosure relates generally to securing internal and/or external communication and information transfer.

BACKGROUND

Enterprises employ a vast number of protocols for internal and/or external communications and information transfer in order to ensure reliability, security and compliance with particular policies. For example, internal and/or external communications and information transfer can include, but are not limited to electronic mail (email), Internet Protocol (IP) telephony, web mail, web-browsing, text messaging over a network of two or more computers (or network connectable, processor-based devices). In general, email allows electronic communication of a text message alone or in combination with graphics and optional attachments; while text or instant messaging is a simpler communication mechanism most frequently employed for transmitting short text messages. These electronic communication media are popular as they provide inexpensive, easy, point-to-point communication that is less intrusive than traditional techniques and/or non-electronic communications. There is an abundance of other benefits, for example, email easily enables one-to-many communication, there is no need to synchronize participants and the content can be planned more easily, among other things. Unfortunately, these media have adversaries and/or protocols that threaten the convenience of and confidence in their use, namely spam, viruses, malware, compliance with corporate and/or regulatory policies, monitoring, and management.

A variety of systems and techniques have been developed and employed to combat spam and malicious code related to electronic communication media. Conventionally, enterprises utilize independent and isolated security, defense, and/or protective techniques which can be detrimental to efficient threat suppression and policy enforcement. For example, an enterprise may utilize a filter associated with email, yet filter definitions and/or identified threats may be ignored in connection with the filter corresponding with instant messaging. Such conventional security and/or protective techniques are vulnerable, weak, and easily penetrated.

DESCRIPTION

Overview

Figure 1:
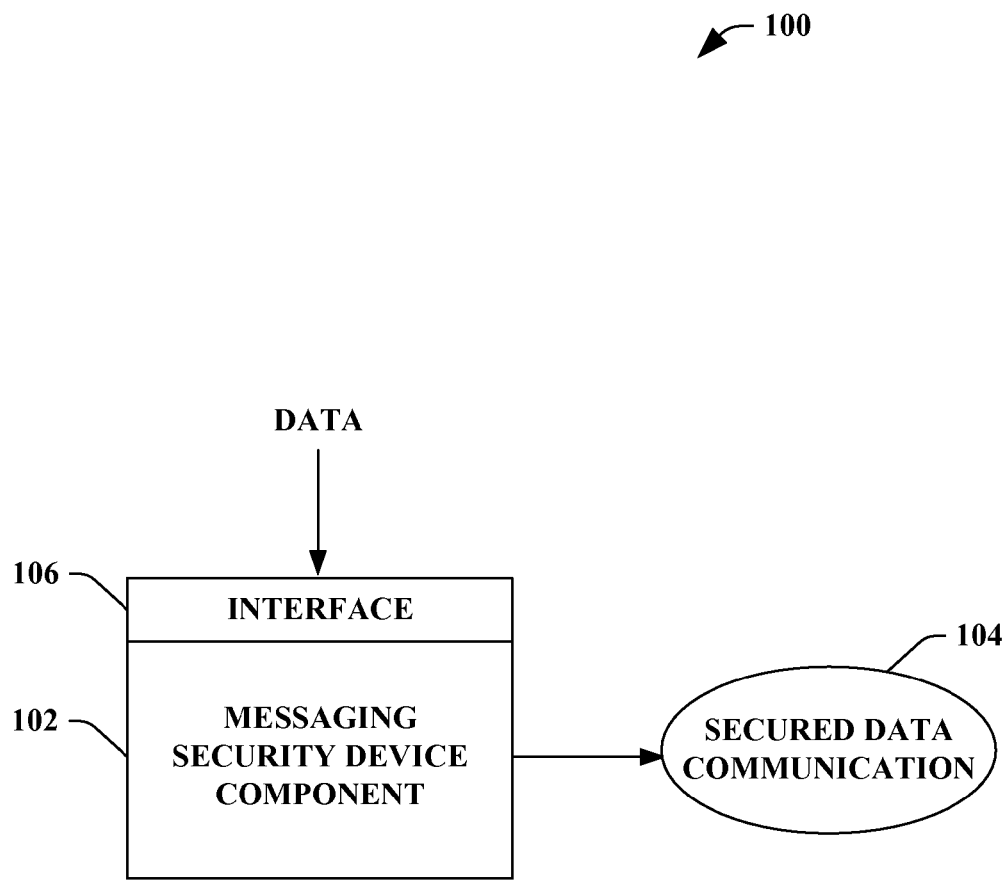
FIG. 1 illustrates a block diagram of an example system that facilitates utilizing a common protocol for a variety of disparate messaging formats associated with internal and/or external communication and information transfer.

The following presents a simplified overview of the specification in order to provide a basic understanding of some aspects described herein. This overview is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing a universal protocol for a variety of disparate messaging formats associated with internal and/or external communication and information transfer. A system can comprise an interface that receives data related to a communication session. A messaging security device component can evaluate the data received and can enable a security measure for preventative monitoring of a threat based on the evaluation, wherein the security measure can be universally applied to two or more disparate messaging formats.

The following description and the annexed drawings set forth in detail certain illustrative aspects of the claimed subject matter. These aspects are indicative, however, of but a few of the various ways in which the principles of the subject matter may be employed and the claimed subject matter is intended to include all such aspects and their equivalents. Other advantages and novel features of the claimed subject matter will become apparent from the following detailed description of example embodiments when considered in conjunction with the drawings.

Description of Example Embodiments

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "engine," "protocol," "communications," and the like are intended to refer to a computer-related entity, either hardware, software (e.g. in execution), and/or firmware. For example, a component can be a process running on a processor, a processor, an object, an executable, a program, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Now turning to the figures, FIG. 1 illustrates a system 100 that facilitates utilizing a common protocol for a variety of disparate messaging formats associated with internal and/or external communication and information transfer. The system 100 can include a messaging security device (MSD) component 102 that can monitor data received thereby establishing a secured data communication 104. The data can be received via an interface component 106 (herein referred to as interface 106 and described in detail infra), wherein a secured data communication 104 can be enabled to a plurality of messaging formats based at least in part upon the data monitoring. The MSD component 102 can enforce security services and/or policies to data communications and information transfers associated with a communication session regardless of a messaging format. The data evaluated by the MSD component 102 can relate to the communication session. Moreover, the communication session can include any suitable number of devices utilizing any number of distinct and specific messaging formats. For instance, the messaging formats can be, but are not limited to being, email, instant messaging, Internet Protocol (IP) telephony, web mail, web-browsing, cable, video-streaming, voice communications, audio communications, video communications, voice mail, video mail, facsimile, and/or any other suitable messaging format utilized for electronic data communication. In addition, the device can be a computer, a machine, a laptop, a portable digital assistant (PDA), a smartphone, a mobile communication device, a cellular phone, a messaging device, a wireless device, a server, a network, a gaming device (e.g. any suitable device capable of utilizing a video game), a portable media device (e.g., any suitable device that can employ media files such as MP3, wave, video clips, etc.), any device capable of utilizing a messaging format, etc. In another example embodiment, the MSD component 102 can be incorporated and/or associated with a router, a data store, a hub, a bridge, a file server, a workstation, a network interface card, a concentrator, a hub, a repeater, and/or any other suitable networking device associated with communications. Furthermore, it is to be appreciated that the data can be, but is not limited to being, most data associated with communications between parties. Moreover, the system 100 can evaluate the data using packet header, deep packet inspection, or the like.

The MSD component 102 allows a universal security policy and/or service to be employed to communication sessions regardless of the specific messaging format being utilized. In a specific example, the MSD component 102 can detect malware associated with a first communication session utilizing a first messaging format and provide a secured data communication 104 to any utilized messaging format in later communication sessions. Conventionally, such security policy had to be independently maintained and implemented for each messaging format. In other words, traditional security services and/or policies could not be implemented across disparate messaging formats in a universal and efficient manner. The MSD component 102 allows integrated and shared security services to be uniformly applied across any messaging format which enhances and optimizes security measures associated with communication sessions.

In one example, an enterprise can utilize messaging formats such as IP telephony, email, web mail, and instant messaging. Upon monitoring and/or evaluating a communication associated with the IP telephony messaging format, the MSD component 102 can ascertain a threat and/or violation associated with a policy (e.g., office, home, enterprise, etc.). Based on such detection, the MSD component 102 can seamlessly apply preventative actions to any other messaging formats including the format that initially contained the threat and/or violation. Thus, if the threat was a malicious virus, not only would the IP telephony messaging format be protected, but email, web mail, and instant messaging can be alerted and corrective measures can be employed therewith. For instance, the IP telephony can be isolated from use, while the web mail, email, and instant messaging have restricted access to IP telephony as well as any other communication sessions that relate to the particular threat. Additionally, the MSD component 102 can initiate protective measures on a user-level such that the particular user on IP telephony can be isolated (rather than the entire messaging format) and disparate messaging formats can be restricted to access that particular user on IP telephony. In other words, the MSD component 102 provides an integrated, common set of security services and policy definitions for multiple messaging protocols and/or formats.

The MSD component 102 can be utilized in most any suitable environment that implements and/or utilizes messaging formats for internal and/or external communications and information transfer. For instance, the system 100 can be employed in an office, an enterprise, a company, a warehouse, an automation environment, a home, a network, a small business, etc. By utilizing the MSD component 102, any communication sessions related to the particular environment (e.g., an office, an enterprise, a company, a warehouse, a home, a network, a small business, etc.) can be secured with a common security, outbound filtering, and/or network linkages. In addition, the system 100 can be utilized by a single device rather than across an entire network and/or multitude of devices in a particular environment. Thus, Bob Jones in an office with 80 other employees can solely utilize the MSD component 102.

In general, the MSD component 102 and the system 100 can share threat and reputation information among different messaging formats (e.g., such that information gleaned and/or obtained from one messaging format/protocol can be used to protect messaging in disparate formats). Moreover, the system 100 can evaluate historical data associated with communication sessions in a common data store (not shown) for any utilized messaging format in order to ascertain protective measures for current and/or future communication sessions related to respective messaging. Furthermore, the MSD component 102 can utilize the common data store to evaluate active communications independent of messaging format in order to provide the secured data communication 104.

In accordance with one aspect of the subject specification, the system 100 can provide unified policy generation and enforcement, common and simplified management platform with corresponding tools, and centralized archival and logging for administration and compliance. The MSD component 102 can initiate linkage with a network to share threat information and to initiate and execute mitigation actions at any level (e.g., network level, message-level, etc.) across users and/or messaging protocols. Additionally, the system 100 can include analysis engines such as anti-spam, authentication, encryption, AV, content security, and outbound compliance. These common analysis and policy engines can be used for analysis of any message irrespective of protocols and subject a message to as few of the analysis steps as possible to determine the appropriate disposition of that message.

It is to be appreciated that the MSD component 102 can handle a variety of messaging formats regardless of type and/or characteristics associated therewith. In particular, the MSD component 102 can provide a security measure that can be applied to one or more messaging formats despite having disparate characteristics and/or details. In other words, the MSD component 102 can provide a universal security measure that can be applied to a plurality of messaging formats while also being able to provide a universal security measure that can be applied to a messaging format with numerous types/kinds of such messaging format. Thus, the MSD component 102 can provide a universal security measure to instant messenger formats, wherein there are instant messenger format of type 1 (e.g., from company A), instant messenger format of type 2 (e.g., from company B), and so on and so forth. Furthermore, the MSD component 102 can employ security to a communication sessions with two or more messaging formats and/or within one messaging format having two or more kinds/types of such messaging format. In general, it is to be appreciated that the MSD component 102 can handle providing security via a universal security measure for a first data type (e.g., messaging format, messaging format type/kind, etc.) and a second data type (e.g., messaging format, messaging format type/kind, etc.).

In addition, the system 100 can include any suitable and/or necessary interface 106, which provides various adapters, connectors, channels, communication paths, etc. to integrate the MSD component 102 into virtually any operating and/or database system(s) and/or with one another. In addition, the interface 106 can provide various adapters, connectors, channels, communication paths, etc., that provide for interaction with the MSD component 102, secured data communication 104, and any other device and/or component associated with the system 100.

Figure 2:
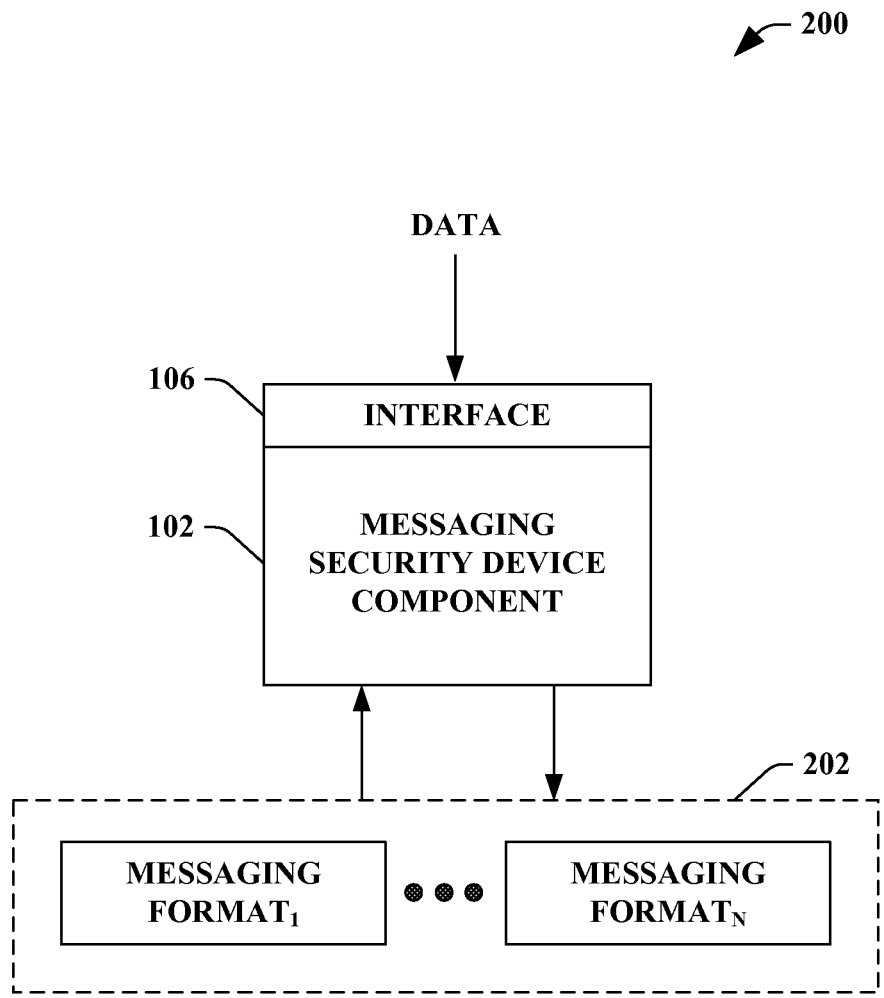
FIG. 2 illustrates a block diagram of an example system that facilitates seamlessly integrating and implementing a service and/or policy definition to multiple messaging formats.

FIG. 2 illustrates a system 200 that facilitates seamlessly integrating and implementing a service and/or policy definition to multiple messaging formats. The system 200 includes the MSD component 102 that can employ security services and/or policies to enforce across a plurality of disparate messaging formats 202 and/or within one messaging format 202 having multiple kinds/types. It is to be appreciated that any suitable number of messaging formats 202 (e.g., communication format) can be evaluated, while the created security measure (based on such evaluation and/or threat detection) can be applied to any suitable number of messaging formats 202 (e.g., communication format). In particular, there can be a message format$_1$ to a message format N, where N is a positive integer, wherein each messaging format can include any number of kinds/types. Specifically, the MSD component 102 can evaluate data related to a communication session related to a first messaging format and implement security measures and/or protective mechanisms to the first messaging format as well as any other utilized messaging formats 202 based on such evaluation (e.g., messaging format$_2$, messaging format$_3$, messaging format$_4$, . . . ). In other words, the MSD component 102 can integrate and share security services across disparate formats, create and enforce a security policy to a messaging format, and provide a uniformly applicable security and policy enforcement based on any detected threat and/or violation regardless of the message format associated therewith.

For instance, a user can utilize various messaging formats 202 within an environment such as, but not limited to, an office, an enterprise, a company, a warehouse, an automation environment, a home, a network, a school, a university, a library, a small business, any environment that can utilize a messaging format, etc. For instance, a user can utilize IP telephony, email, and instant messaging on a desktop machine at work and/or home. The MSD component 102 allows all messaging formats to be analyzed and security policies and/or services can be universally generated and/or seamlessly applied to the messaging formats 202. Thus, the MSD component 102 can identify a threat related to email and further apply a security measure and/or protective mechanism to email, IP telephony, and instant messaging. If, for instance, the threat is a newly identified restricted email, such restriction can be implemented to email (e.g., blocking the email address, marking the email as spam, etc.), IP telephony (e.g., blocking related IP addresses, domain names, web sites, etc.) and instant messaging (e.g., identifying the username/handle and corresponding machine to block, blocking the respective IP address, etc.).

It is to be appreciated that the system 200 can identify messaging format (e.g., email, instant messaging, web mail, web browsing, IP telephony, audio communications, video communications, voice mail, video mail, and the like) traffic to and/or from a particular single user machine/device. The system 200 can automatically identify various user names by the owner of that machine. In other words, a user utilizing a screen name for instant messaging and an email address can send malicious attacks to an environment. Based on such automatic identification, the MSD component 102 can enforce a common policy. Thus, the MSD component 102 can create a common and universal policy for both instant messaging and email by blocking the particular user from the identified machine.

For instance, by looking at user identifications (IDs) used in, but not limited to, SMTP (Simple Mail Transfer Protocol), POP (Post Office Protocol), IMAP (Internet Message Access Protocol), MAPI (Messaging Application Programming Interface), etc. traffic to an email server, the owner of a machine/device can be identified. The MSD component 102 can tie such data to an instant messaging handle and/or phone number by querying a directory (e.g., LDAP (Lightweight Directory Access Protocol), AD (Address Directory), etc.). Moreover, the system 200 can sniff public instant messaging traffic (e.g., AIM (AOL-brand Instant Messenger), MSN (Microsoft-brand Instant Messenger, Y! (Yahoo-brand Instant Messenger, etc.) to capture what IDs are used to login to those networks and to associate them to a handle. By implementing the above, the MSD component 102 can ascertain that, for instance, instant messaging service$_1$ handle "maverick," instant messaging service 2 handle "Lt. Pete Mitchell," and instant messaging service 3 handle "tcruise," email "tom.cruise@pictures.com," and telephone "310-555-1213" are all disparate personas for the same person "Tom Cruise" in the directory. The MSD component 102 can universally apply a policy to the email and instant messaging formats regardless of differences and characteristics associated therewith. As used herein, it is to be understood that a 'persona' can refer to an alias, an identity, a role or the like that an individual can assume with various messaging formats.

These identified personas (e.g., aggregated identity, etc.) can be utilized to converge on an individual reputation score (e.g., rating to ascertain threat-level of user) faster than if there was access to only one form of messaging format as in conventional techniques. Additionally, the identity and reputation can then be utilized to apply a comprehensive policy. For instance, if Tom Cruise is harassing Nicole Kidman, emails, instant messages, IP telephony can block communications from the user and any identified personas (e.g. email addresses, instant message handles, phone numbers, etc.) related to that owner's machine/device.

In another example, traffic rates and other measures can be evaluated by the MSD component 102 to ascertain that it is not Tom Cruise who is sending the harassing emails, instant messages, and phone calls (e.g., via softphone on a PC, IP telephony, etc.), but a zombie that is infecting Tom's machine. The MSD component 102 can instruct the network (e.g., via a system log message to a MARS (Monitoring, Analysis and Response System) device) to instruct the switch nearest to that device to place that port (and hence the device) into a quarantine VLAN (Virtual Local Area Network) until the infection is removed. Moreover, since the MSD component 102 handles email, instant messaging, IP telephony, etc., the identified machine/device can be informed via email, instant messaging, IP telephony, etc. that such machine/device is compromised and even provide a link and/or instructions on how to disinfect such machine/device.

Figure 3:
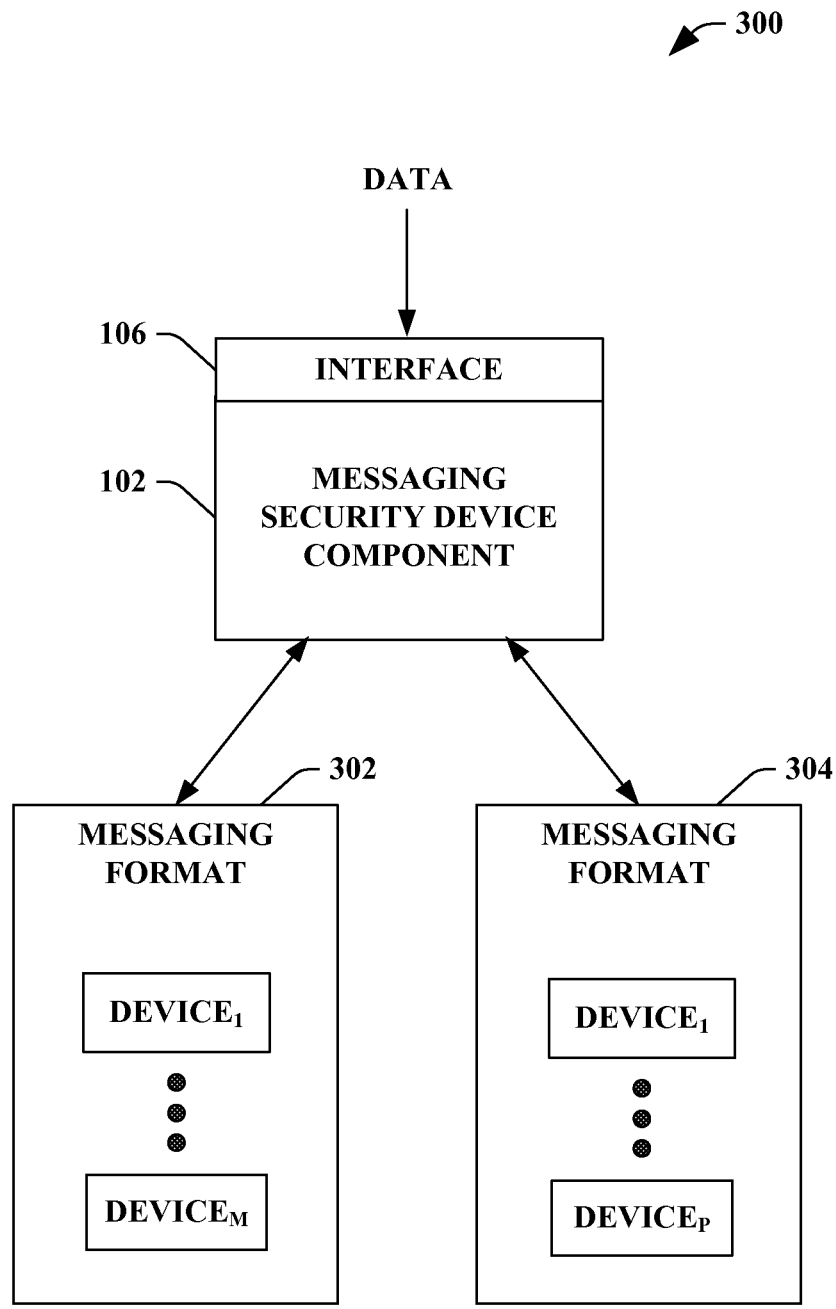
FIG. 3 illustrates a block diagram of an example system that facilitates data monitoring and management of communications associated with a plurality of messaging formats including a multitude of devices.

FIG. 3 illustrates a system 300 that facilitates data monitoring and management of communications associated with a plurality of messaging formats including a multitude of devices. The MSD component 102 universally applies a security service and/or policy seamlessly across a plurality of messaging formats. The MSD component 102 can evaluate data associated with a communication session to detect a threat and/or violation, wherein the MSD component 102 can generate and enforce a security measure in light of such detection. Moreover, such security measure can be generated and enforced seamlessly over a variety of disparate messaging formats and/or within one messaging format having multiple kinds/types. Furthermore, the MSD component 102 can identify the specific source of the threat and/or violation regardless of any masking and/or zombie technique utilized (e.g., multiple personas for one machine, multiple emails, multiple handles, multiple phone numbers, etc.). Thus, the MSD component 102 can identify a machine/device and all related messaging formats that the threat or violation originated rather than a single persona associated with a single message format. The MSD component 102 can identify the type of the source of the threat, wherein the type can be a device (e.g., machine, computer, laptop, gaming device, etc.), a user (e.g., a person, an identity, a persona, etc.), and a type/content of the communication itself (e.g., characteristic of the threat, attachment in email, etc.).

Moreover, upon such identification of machine/user/persona, the MSD component 102 can provide repair instructions associated with such detected threat utilizing one of the utilized messaging formats (e.g., email, IP telephony, web mail, web-browsing, video streams, instant messaging, etc.). It is to be appreciated that the repair instructions can be communicated over a disparate messaging format in comparison to the messaging format that includes the identified threat.

The system 300 can include a messaging format 302 and a messaging format 304, wherein the MSD component 102 can provide secure communications associated therewith. The messaging format 302 can include any suitable number of devices therewith, such as a device$_1$ to device$_M$, where M is a positive integer. Moreover, the messaging format 304 can include any suitable number of devices therewith, such as device$_1$ to device$_P$, where P is a positive integer. As discussed supra, there can be any suitable number of messaging formats. For example, the messaging format 302 can be email, wherein users can utilize any suitable device that utilizes email (e.g., laptop, desktop computer, machine, PDA, smartphone, mobile communication device, a portable media device, a gaming device, etc.). Furthermore, there can be any number of such devices that utilize the messaging format 302.

Figure 4:
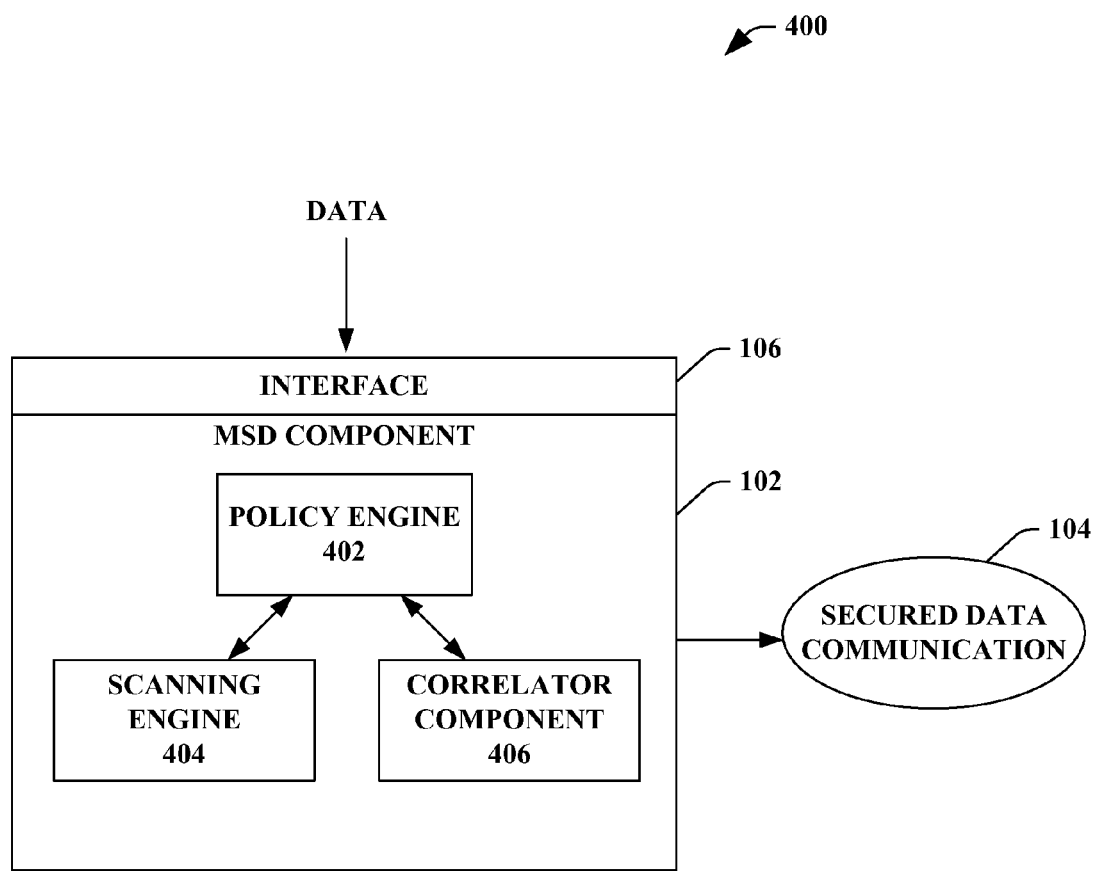
FIG. 4 illustrates a block diagram of an example system that facilitates implementing secured data communications utilizing a uniform policy definition and/or service.

FIG. 4 illustrates a system 400 that facilitates implementing secured data communications utilizing a uniform policy definition and/or service. The system 400 can include the MSD component 102 that provides secured data communication 104 based on evaluations on received data, wherein such data can relate to at least one communication session including at least one messaging format. The MSD component 102 can analyze and detect at least one threat and/or violation of a policy and initiate a security measure and/or protective maintenance to the messaging format the threat/violation was detected and any other utilized messaging formats. Therefore, security measures and/or protective maintenance can be employed in a universal and seamless manner to a plurality of messaging formats, which allows all messaging formats to be protected from any threat/violation that targets and/or affects a particular messaging format.

In one example, the MSD component 102 can receive any data related to a communication session regardless of messaging format. The messaging formats can be distilled into a common format, wherein a security measure and/or protective maintenance can be uniformly applied therewith. For instance, the common format can be implemented based on the fact that communications in various formats include elements (e.g., sender, receiver, time, header, footer, subject, body, time stamp, etc.) that can be similarly scanned and/or gleaned to identify threats and/or malicious behavior/characteristics.

Based at least in part upon detection and/or identification of a threat and/or violation, the MSD component 102 can create the security measure and/or protective maintenance. Such security measure and/or protective maintenance can be employed by a policy engine 402. The policy engine 402 can implement a uniform treatment of any utilized messaging type and/or format. Thus, based on a detected threat such as a virus in an email, the policy engine 402 can enforce restriction and/or blockage of such virus in email (e.g., including all email aliases associated with the identified machine/device) as well as other messaging formats such as, but not limited to, IP telephony, web mail, instant messaging (e.g., including all handles associated with the identified machine/device), and the like.

The system 400 can include a scanning engine 404 that can evaluate data passed in each messaging and/or communication format. The scanning engine 404 can be utilized to analyze data in a communication session regardless of format, wherein such analysis can be employed to create security measures and/or protective maintenance such as a filter, a policy, etc. For instance, the scanning engine 404 can be any suitable type of filter, such as, but not limited to, an anti-spam filter, an AV (Anti-Virus) filter, a URL (Universal Resource Locator) filter, a URI (Uniform Resource Identifier) filter, a content analysis, a compliance filter, and an authentication filter, content security, outbound compliance, encryption, etc. In addition, it is to be appreciated that the scanning engine 404 can include analysis of any historical data and/or provide dynamic analysis of communication sessions (e.g., providing real-time, up-to-date protection).

The system 400 can further utilize a correlator component 406 that can aggregate data associated with any suitable communication session and provide the following: 1) implementation of a protective action and/or security measure; and 2) reporting of such identified threats and/or policy violations. For instance, the correlator component 406 can evaluate historical data related to a past communication session and identify a particular machine with various personas that are harmful. Based on such identification, the correlator component 406 can provide a protective action and/or security measure to all available and/or utilized messaging formats. In addition, the correlator component 406 can provide a report of such detection to another entity such as, but not limited to, CS-MARS, and the like for further correlation and/or action.

The system 400 can utilize a common analysis engine (not shown). The common analysis engine can use the substantially similar analysis engine (e.g., as applicable for a given format) and a consistent scoring mechanism to rate treats and compliance. Furthermore, a message scoring mechanism can be defined that aggregates the results of each analysis engine (e.g., as applicable). An example structure follows:

| Field | Example Possible Value | Description |
|---|---|---|
| Message Type | Email, IM, Webmail, . . . | What is the original message type? |
| Message Sub-Type | Mail provider 1, Mail provider 2, etc. | What is the subtype? If IM, what kind of IM? If email, what was the sending MTA? |
| Envelope From | <value> | Who is the envelope from? |
| Message From | <value> | Who is the message from? |
| Apparently From | <value> | Using internal data, try to determine who the message is from. For example, using email logs try to determine an IM sender. |
| Handle From | <value> | What is the handle of the sender? |
| Envelope To | <value> | Who is the envelope to? |
| Message To | <value> | Who is the message to? |
| Apparently To | <value> | Using internal data, try to determine who the message is to. |
| Handle To | <value> | What is the handle of the recipient? |
| Sending IP address | <value> | IP Address of the sending system |
| Message Date | <value> | Stated date and time contained in message. |

-continued

| Field | Example Possible Value | Description |
|---|---|---|
| Parse Date | <value> | Date and time message was parsed (in case message date is forged) |
| Hop1 . . . HopN | <value> | Names and IP addresses of intermediate hops before this system. |
| Subject | <value> | Subject of the message |
| Receiving Interface | <value> | Which interface did the message arrive from? |
| Recipient Count | <value> | How many recipients were there on the original message? |
| Header1..HeaderN | <value> | Any other headers not already enumerated? |
| Message Size | <value> | Message size |
| Recipient server | <value> | Where is this message going? For email this field would contain the MX lookup information of the receiving host. For webmail this field would contain the URL of the http post. |
| Attachment count | <value> | Number of attachments |
| Attachment type | <value> | What are the attachment type(s)? |
| Attachment size | <value> | Size of attachment(s)? |
| Filter Metadata | <value> | Data as determined by the prefilters (example spam score). |
| Filter Metadata | | |
| Filter Metadata | | |
| Original message | <value> | The original unchanged message. Useful for reconstruction later. |

It is to be appreciated that a parser (not shown) can attempt to define most fields. In the case where a field does not apply, then the parser can complete the field with the closest matching field. For example, in the case of an instant message, there is no such field as an Envelope From or Message From. In this case, the parser can attempt to discover the "Apparently From" field, and if successful use that data to populate Envelope From and Message From. If unsuccessful, then all four fields should be set to be the handle. Another example can be the Message Date field. Again, in an instant message, there is no formal Date field, so the time and date that the parser received the instant message should be used to populate both the Message Date and Parse Date fields.

Figure 5:
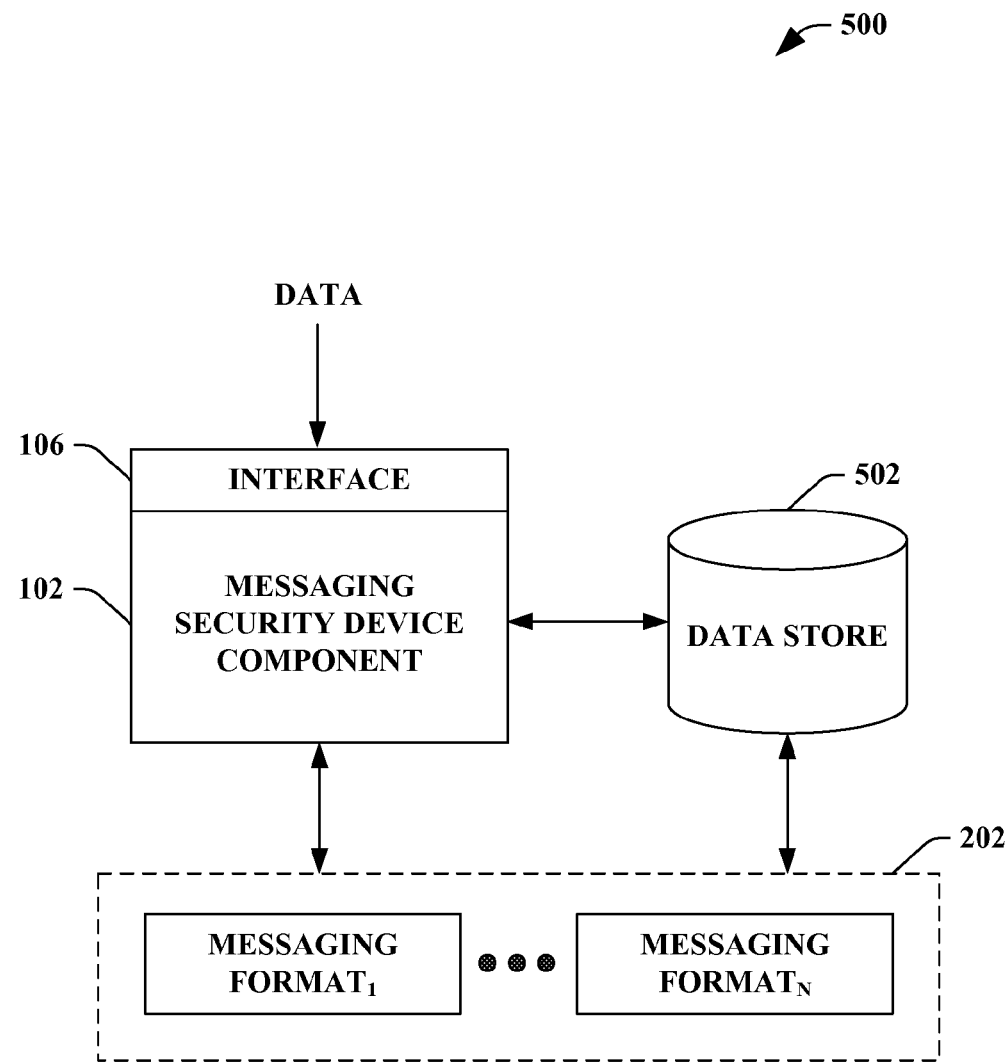
FIG. 5 illustrates a block diagram of an example system that facilitates utilizing communication session data related to a particular messaging format to enable a common policy and/or security service to a plurality of messaging formats.

FIG. 5 illustrates a system 500 that facilitates utilizing communication session data related to a particular messaging format to enable a common policy and/or security service to a plurality of messaging formats. The system 500 can further include a data store 502 that can include any suitable data related to the messaging security device (MSD) component 102, messaging formats 202, data, communication sessions, etc. For example, the data store 502 can include, but not limited to including, user profiles, user data, device data, network settings, email data, IP telephony data, web mail data, identified personas, instant messaging data, instant messaging handles, web-browsing data, Internet Protocol (IP) addresses, messaging format data, communication session data, historic data related to communication sessions, policies, security measures, protective maintenance, corrective techniques, repair instructions, links to correct and/or disinfect, detected threats, identified violations of policies, user threat score based on infractions, host data, and/or any other data associated with the system 500. In addition, the data store 502 can be common to any utilized messaging format 202, wherein such commonality facilitates disseminating such identified threats and/or protective measures to most all messaging formats. In particular, the data store 502 can include identities involved in communication sessions such as, but not limited to, email address, IP address, instant messaging handle, a URI (Uniform Resource Identifier) including a SIP (Session Initiation Protocol) type URI, etc. Moreover, the data store 502 can facilitate tracking behavior/trends of hosts internal to an enterprise to aid in zombie (e.g., discussed supra, hostile take-over and/or manipulation of a device) detection and dealing with zero-day scenarios. The data store 502 also can store active communication sessions, which can provide nimbler cross protocol mitigation or policy actions.

It is to be appreciated that the data store 502 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 502 of the subject systems and methods is intended to comprise, without being limited to, these and any other suitable types of memory. In addition, it is to be appreciated that the data store 502 can be a server, a database, a hard drive, and the like.

Figure 6:
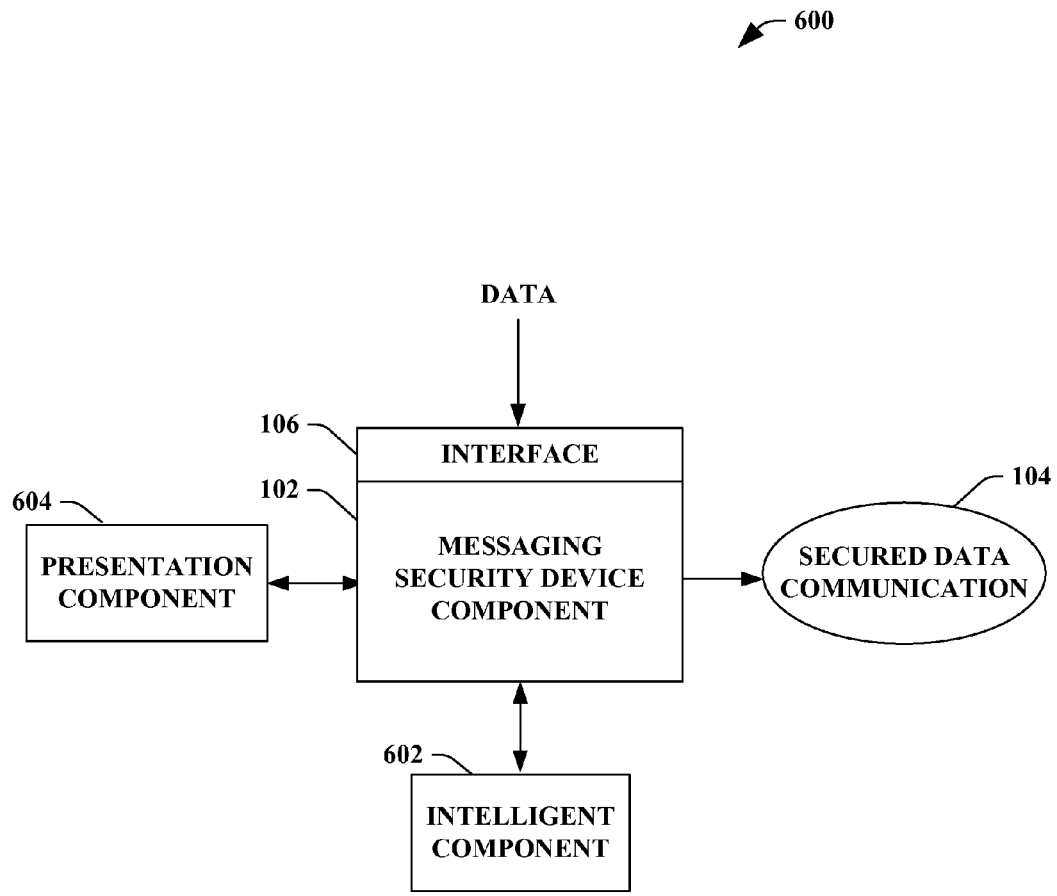
FIG. 6 illustrates a block diagram of an example system that facilitates employing a common protocol for a variety of disparate messaging formats associated with internal and/or external communication and information transfer.

FIG. 6 illustrates a system 600 that employs intelligence to facilitate utilizing a common protocol for a variety of disparate messaging formats associated with internal and/or external communication and information transfer. The system 600 can include the messaging security device (MSD) component 102, secured data communications 104, and interface 106 can be substantially similar to respective components, communications, and interfaces described in previous figures. The system 600 further includes an intelligent component 602. The intelligent component 602 can be utilized by the MSD component 102 to enable secured communications utilizing policies, security measures and the like based on identified threats between various and disparate messaging formats seamlessly. For example, the intelligent component 602 can infer threats, source of threats, personas, messaging formats utilized, security measures, protective maintenance, corrective measures, repair techniques, communication session participants, target machine, target device, devices on a network, network settings, policies, limits, thresholds, users, user profiles, user data, device data, email data, IP telephony data, web mail data, instant messaging data, instant messaging handles, web-browsing data, Internet Protocol (IP) addresses, messaging format data, communication session data, corrective techniques, repair instructions, links to correct and/or disinfect, user threat score based on infractions, host data, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The MSD component 102 can further utilize a presentation component 604 that provides various types of user interfaces to facilitate interaction between a user and any component coupled to the MSD component 102. As depicted, the presentation component 604 is a separate entity that can be utilized with the MSD component 102. However, it is to be appreciated that the presentation component 604 and/or similar view components can be incorporated into the MSD component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the MSD component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
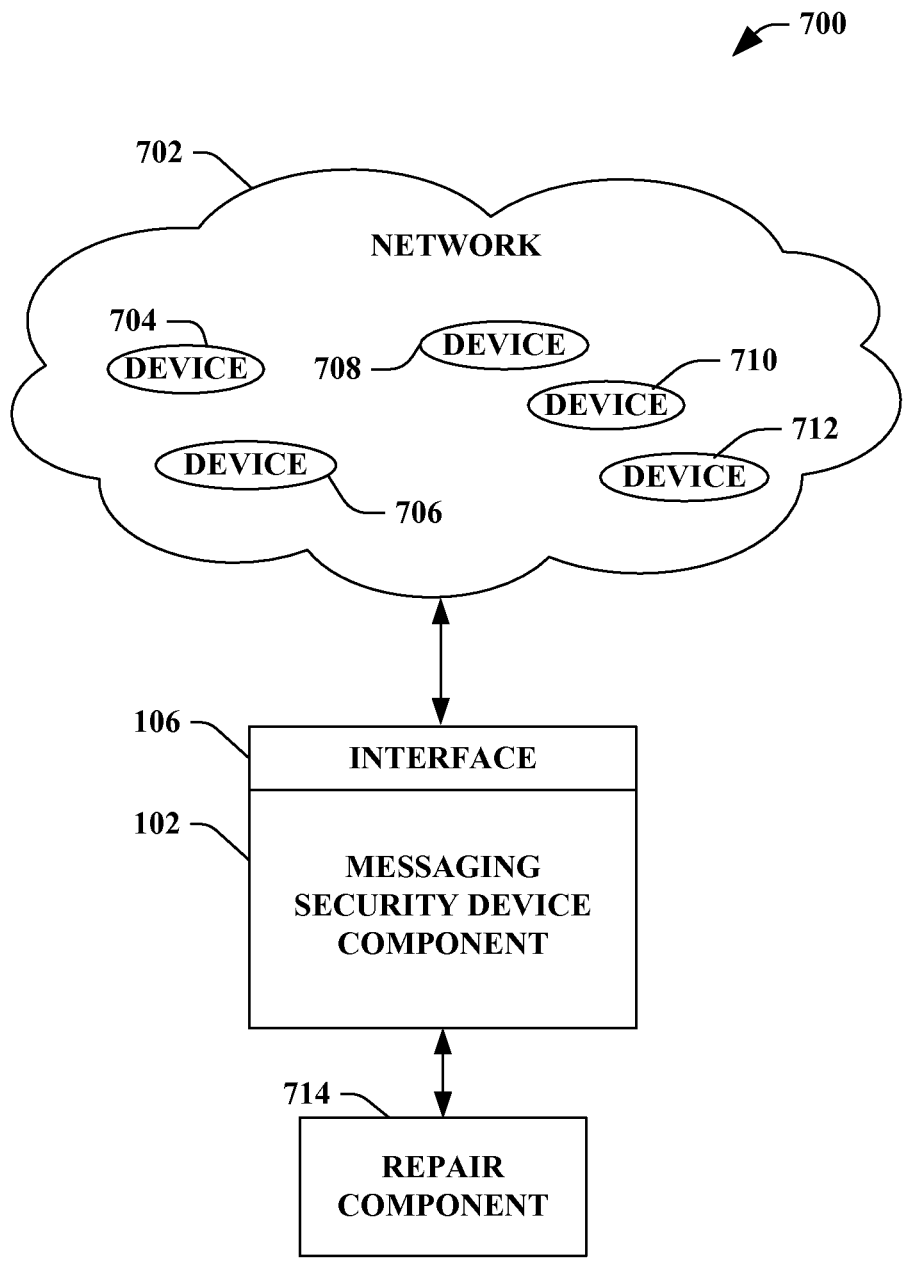
FIG. 7 illustrates a block diagram of an example system that facilitates securing communications within a network between disparate messaging formats and/or protocols.

FIG. 7 illustrates a system that facilitates securing communications within a network between disparate messaging formats and/or protocols. The system 700 can include the MSD component 102 that facilitates implementing a security measure and/or preventative maintenance associated with a communication across a plurality of disparate messaging formats. The MSD component 102 can be utilized with a network 702 that can include a plurality of devices and respective messaging and/or communication formats, such as device 704, device 706, device 708, device 710, and the device 712, wherein such devices can be collectively referred to as "devices." It is to be appreciated that the network 702 can include any suitable number of devices and that such any suitable number of devices can utilize most any number of messaging and/or communication formats.

The system 700 can further include a repair component 714 that can evaluate the identified threat and/or violation associated with the communication session (and associated messaging formats) to initiate a corrective measure and/or protective maintenance to the infected entity. For instance, based at least in part upon the MSD component 102 having access to any messaging format utilized by the network 702, the repair component 714 can provide a security measure and/or preventative maintenance to a device (e.g., infected device) via any suitable messaging format (e.g., non-infected). In one example, the repair component 714 can provide corrective data such as, but not limited to, repair instructions, links, help files, and the like.

Figure 8:
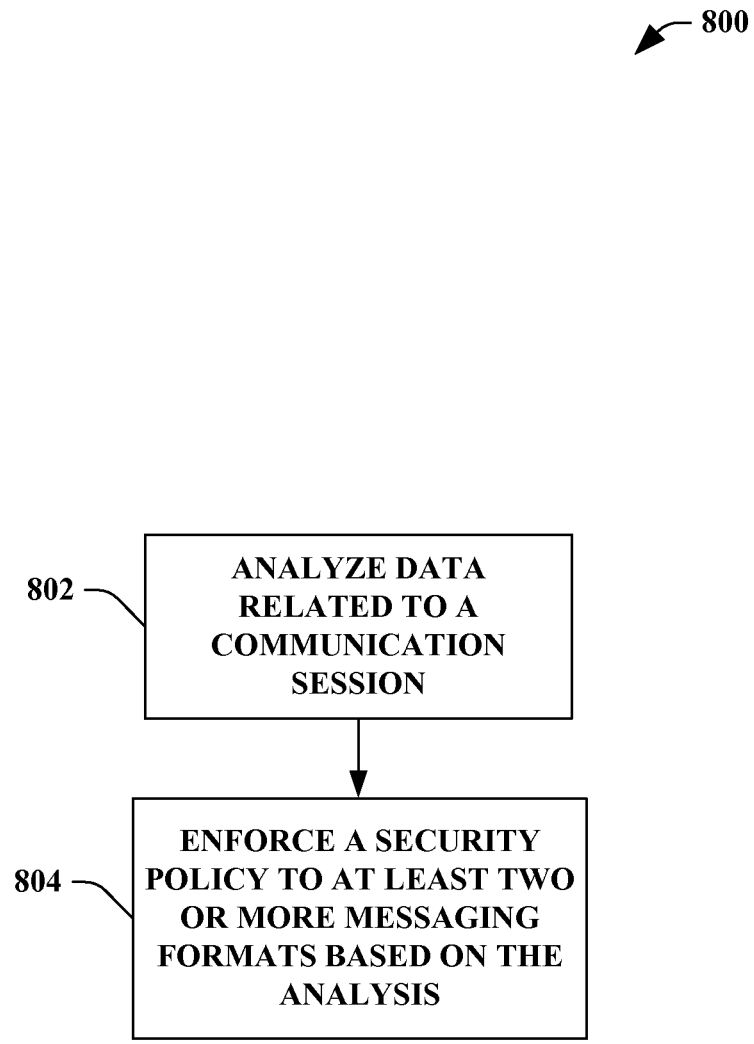
FIG. 8 illustrates an example methodology that facilitates utilizing a common protocol for a variety of disparate messaging formats associated with internal and/or external communication and information transfer.
Figure 9:
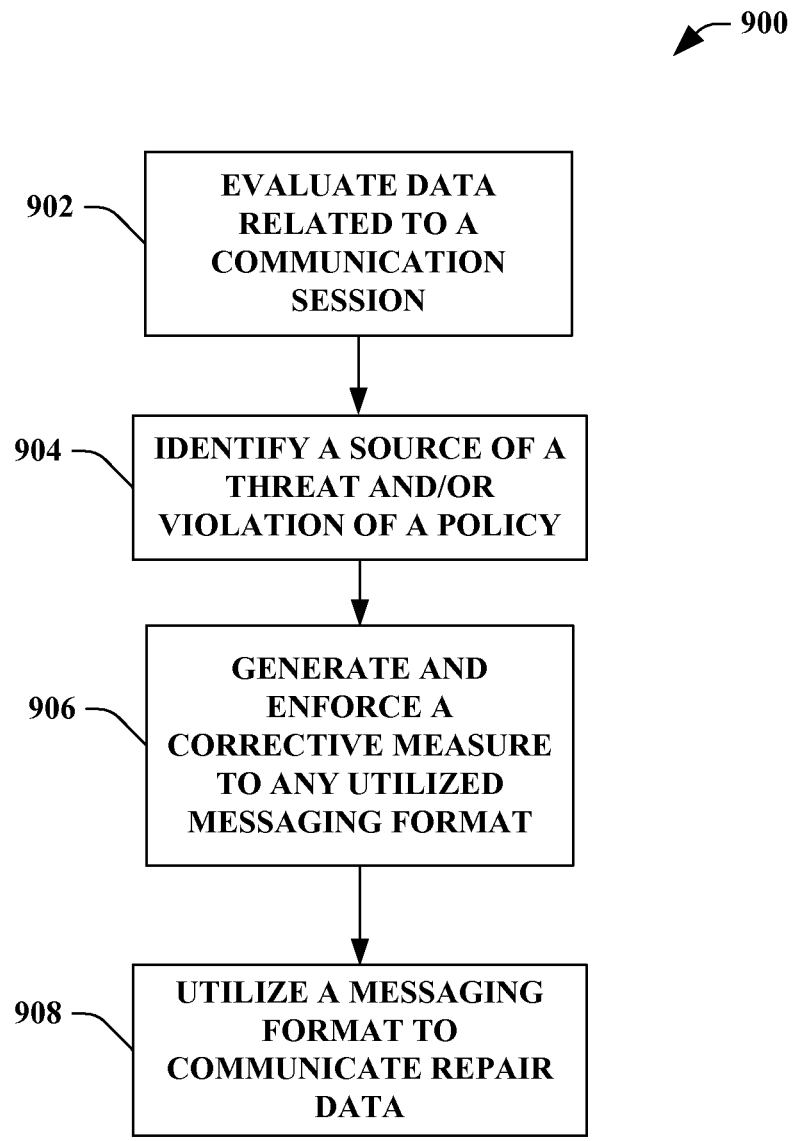
FIG. 9 illustrates an example methodology for seamlessly integrating and implementing a service and/or policy definition to multiple messaging formats.
Figure 10:
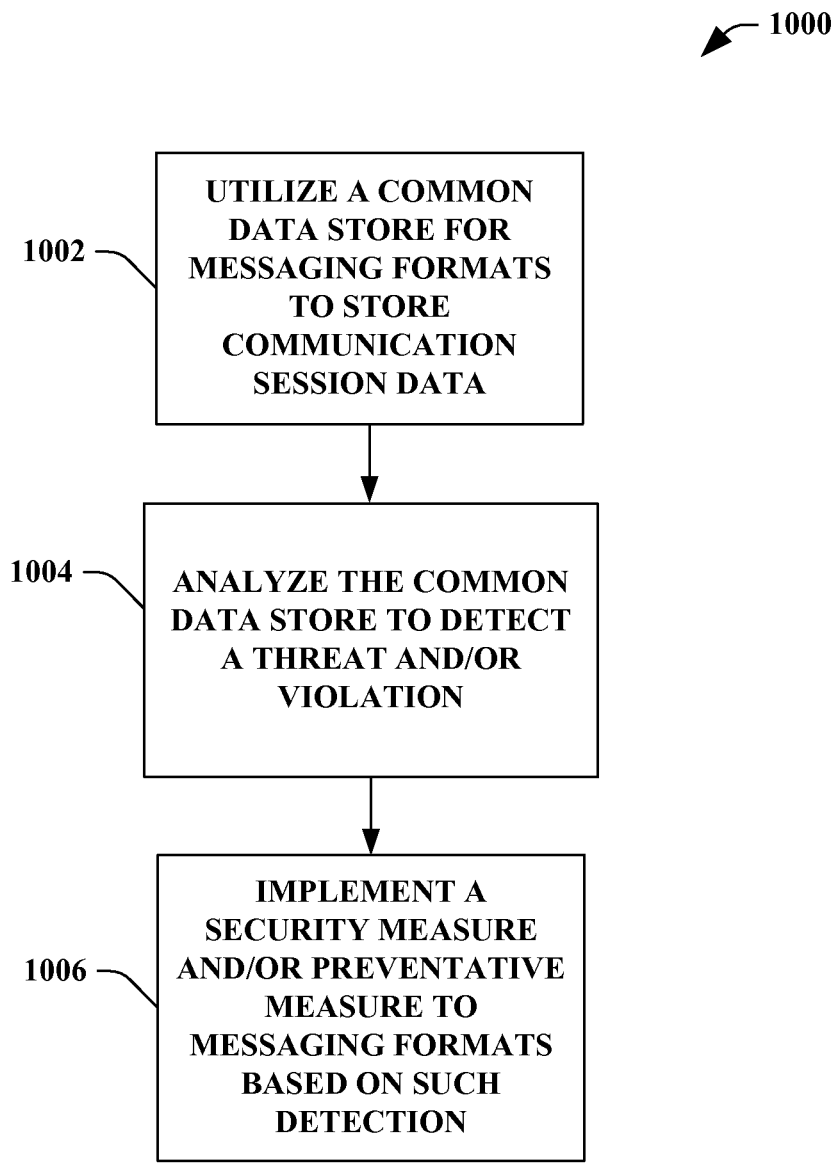
FIG. 10 illustrates an example methodology that facilitates utilizing communication session data related to a particular messaging format to enable a common policy and/or security service to a plurality of messaging formats.

FIGS. 8-10 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 that facilitates utilizing a common protocol for a variety of disparate messaging formats associated with internal and/or external communication and information transfer. At reference numeral 802, data related to a communication session can be analyzed. The communication session can include any suitable number of devices utilizing any number of distinct and specific messaging formats. For instance, the messaging formats can be, but are not limited to being, email, instant messaging, Internet Protocol (IP) telephony, web mail, web-browsing, cable, video-streaming, voice communications, audio communications, video communications, voice mail, video mail, facsimile, and/or any other suitable messaging format utilized for electronic data communication. In addition, the device can be a computer, a machine, a laptop, a portable digital assistant (PDA), a smartphone, a mobile communication device, a cellular phone, a messaging device, a wireless device, a server, a network, a gaming device (e.g., any suitable device capable of utilizing a video game), a portable media device (e.g., any suitable device that can employ media files such as MP3, wave, video clips, etc.), any device capable of utilizing a messaging format, etc. Moreover, the analysis associated with the data can ascertain a potential and/or harmful threat and/or violation of policy exists.

At reference numeral 804, a security policy can be enforced seamlessly to at least two or more messaging formats based on the analysis. The security policy can be applied to any suitable and/or utilized messaging format based on the detected threat and/or violation regardless of which specific messaging format the initial threat was detected. In other words, a threat can be identified in a first messaging format and a security policy can be seamlessly applied to the first messaging format as well as any other utilized messaging format based upon such threat. This can allow integrated and shared security services to be uniformly applied across any messaging format which enhances and optimizes security measures associated with communication sessions. Furthermore, the security policy can be applied to a communication sessions with two or more messaging formats and/or within one messaging format having two or more kinds/types of such messaging format. In general, it is to be appreciated that the security policy can be for a first data type (e.g. messaging format, messaging format type/kind, etc.) and a second data type (e.g. messaging format, messaging format type/kind, etc.).

FIG. 9 illustrates a methodology 900 for seamlessly integrating and implementing a service and/or policy definition to multiple messaging formats. At reference numeral 902, data related to a communication session can be evaluated. The communication session be associated with any messaging formats such as, but not limited to, email, instant messaging, Internet Protocol (IP) telephony, web mail, web-browsing, cable, video-streaming, voice communications, audio communications, video communications, voice mail, video mail, facsimile, and/or any other suitable messaging format utilized for electronic data communication, etc. Moreover, the communication session can be related to any environment. For instance, the environment can be an office, an enterprise, a company, a warehouse, an automation environment, a home, a network, a small business, etc.

At reference numeral 904, a source of a threat and/or violation of a policy can be identified. Thus, a machine and/or device associated with a specific threat and/or violation can be ascertained and/or located. It is to be appreciated that by identifying the particular machine/device associated with the threat, the methodology 900 accounts for multiple personas associated with the source of the threat and/or violation. For example, a machine can be the source of multiple attacks through email, instant messaging, IP telephony, and/or any other messaging format. Moreover, such machine can utilize numerous email addresses, instant messaging handles, IP telephony numbers, etc. for such attacks. In other words, the machine and associated personas can be identified as the source of a threat and/or violation of a policy. Furthermore, the type of the source of the threat can be identified, wherein the type can be a device (e.g., machine, computer, laptop, gaming device, etc.), a user (e.g., a person, an identity, a persona, etc.), and a type/content of the communication itself (e.g., characteristic of the threat, attachment in email, etc.).

At reference numeral 906, a corrective measure can be generated and enforced to any utilized messaging format. Based at least in part upon the identified target and/or source of the threat and/or violation, a corrective measure can be employed in order to thwart future and/or existing attacks associated with the target and/or source. Furthermore, the corrective measure can be applied to any messaging format regardless of any details associated therewith. In other words, the security measure can be universally applied to a variety of disparate messaging formats and/or within one messaging format having multiple kinds/types in a seamless manner. At reference numeral 908, a messaging format can be utilized to communicate repair data. The repair data can be, but is not limited to, repair instructions, links, help files, any suitable data that can mitigate a detected threat and/or violation, etc. Upon detection and enforcement of a corrective measure, the infected device can be provided with instructions and/or tips on how to disinfect and/or repair damage inflicted from the threat and/or violation via a messaging format that is uninfected and/or clean of any threat(s).

FIG. 10 illustrates a methodology 1000 that facilitates utilizing communication session data related to a particular messaging format to enable a common policy and/or security service to a plurality of messaging formats. At reference numeral 1002, a common data store can be utilized to store communication session data. The communication session can include any suitable number of devices utilizing distinct and specific messaging formats such as, but not limited to, email, instant messaging, IP telephony, web mail, web-browsing, cable, video-streaming, voice communications, audio communications, video communications, voice mail, video mail, facsimile, and/or any other suitable messaging format utilized for electronic data communication. Moreover, the device can be a computer, a machine, a laptop, a PDA, a smartphone, a gaming device, a portable media device, a mobile communication device, a cellular phone, a messaging device, a wireless device, a server, a network, any device capable of utilizing a messaging format, etc. It is to be appreciated that the common data store can store any data related to a communication session such as active communications, past communications, device specifics, user data, network data, environment data, message formats, user personas, etc.

At reference numeral 1004, the common data store can be analyzed in order to detect a threat and/or violation. In particular, previous communication sessions and/or historic data can be evaluated to glean information associated with security threats and/or policy violations. Moreover, the common data store can be dynamically analyzed to provide real-time analysis associated with threat and/or violation. At reference numeral 1006, a security measure and/or preventative measure can be implemented to a plurality of messaging formats based on such detection associated with the common data store. This can allow integrated and shared security services to be uniformly applied across any messaging format and/or within one messaging format having multiple kinds/types which enhances and optimizes security measures associated with communication sessions.

Figure 11:
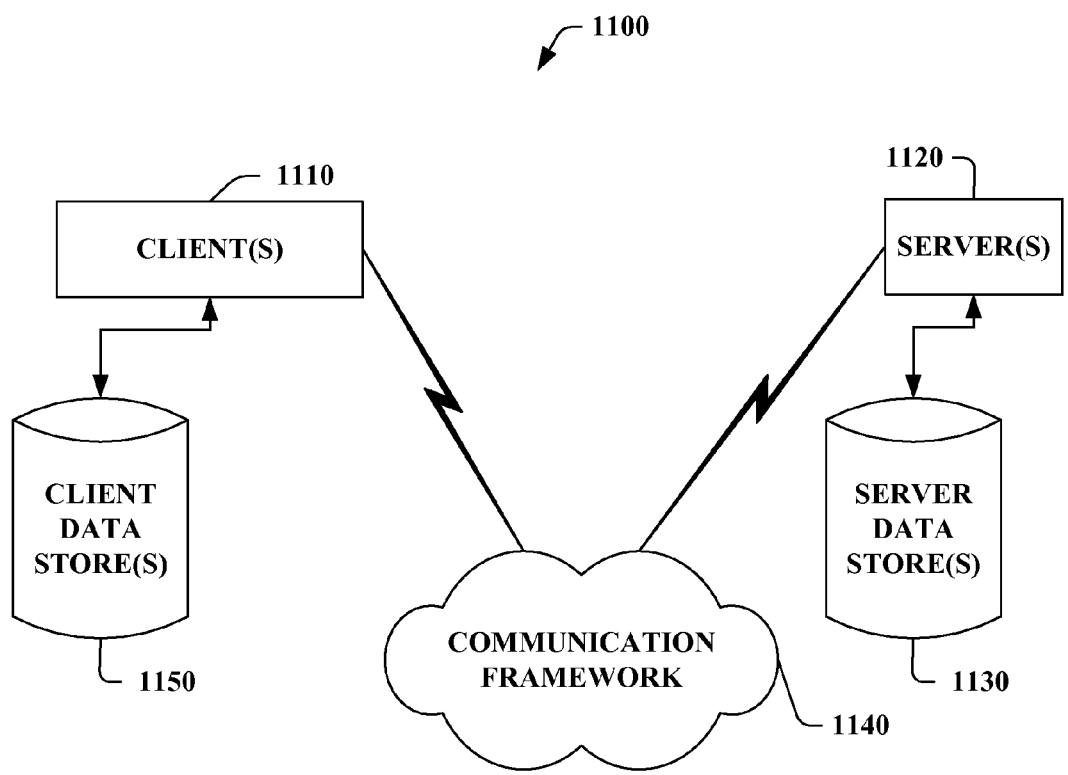
FIG. 11 illustrates an example networking environment, wherein the novel aspects of the claimed subject matter can be employed.
Figure 12:
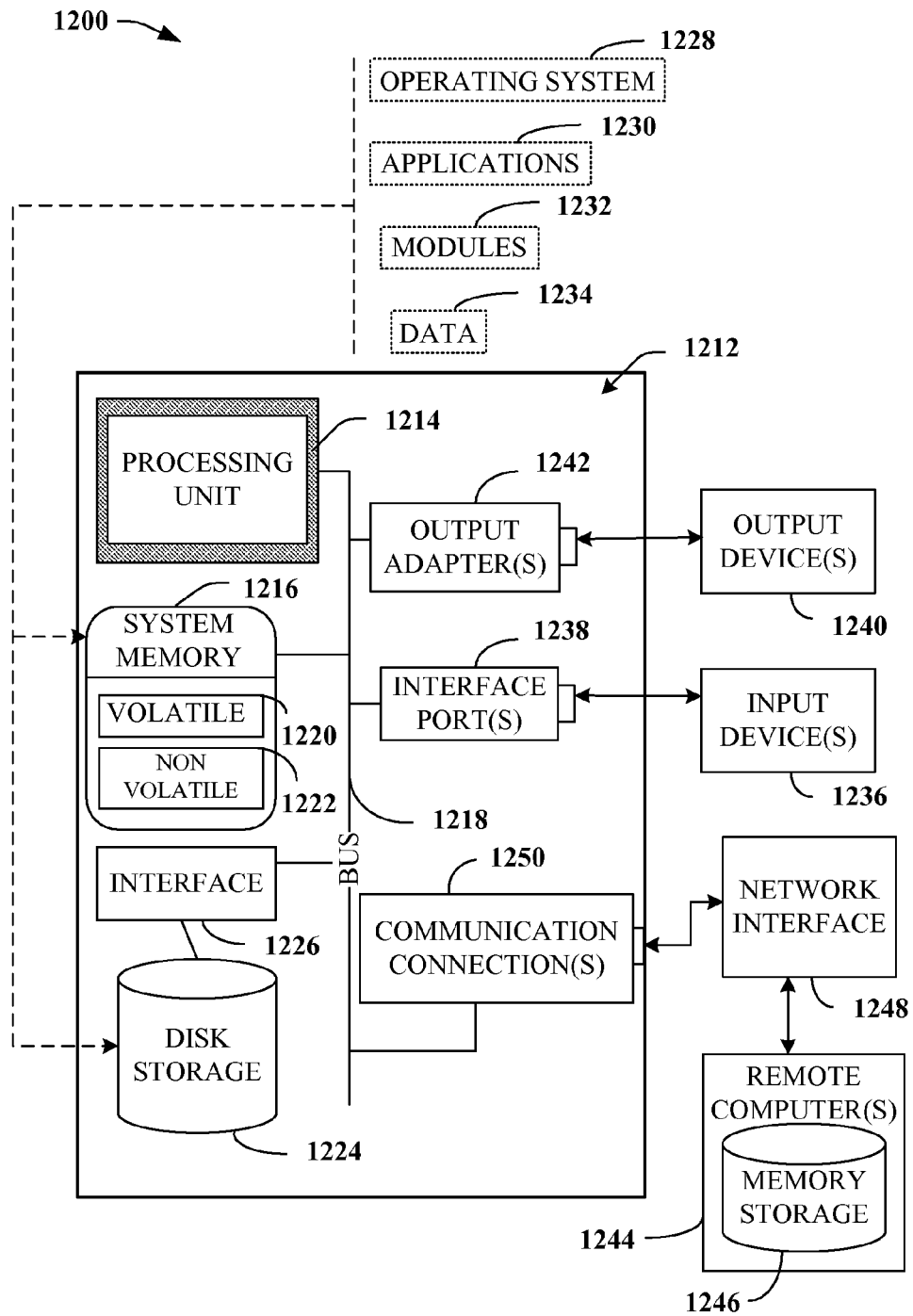
FIG. 12 illustrates an example operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a messaging security device (MSD) component that facilitates employing a universal security service and/or policy definition for a plurality of messaging formats, as described in the previous figures, can be implemented in such suitable computing environment. While the claimed subject matter has been described above in the general context of computer-executable instructions of a computer program that runs on a local computer and/or remote computer, those skilled in the art will recognize that the subject specification also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an example environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for example purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functionality performed by the above described components, devices, circuits, systems and the like, the terms (including a reference to a "means") used to describe such components are intended to correspond, unless otherwise indicated, to any component which performs the specified functionality of the described component (e.g., a functional equivalent), even though not structurally equivalent to the disclosed structure, which performs the functionality in the herein illustrated example aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
    an interface component of a computer processor for receiving data related to a communication session; and
    a messaging security device (MSD) component of the computer processor for dynamically evaluating the data related to a first and a second communication session involving electronic messages, each communication session corresponding to a disparate messaging protocol, identifies a first user identifier corresponding to the first communication session and a second user identifier corresponding to the second communication session in a messaging protocol different than the first communication session, determines that the first user identifier and the second user identifier correspond to two personas of a single user, enables a security measure for preventative monitoring of the single user, and universally applies the security measure to the disparate messaging protocols of the single user.

2. The system of claim 1, the messaging protocol is at least one of email, instant messaging, web-browsing, web mail, Internet Protocol (IP) telephony, audio communications, video communications, voice mail, video mail, and facsimile.

3. The system of claim 1, the first communication session relates to at least one device suitable for transmission of the data, the device is at least one of a gaming device, a portable media device, a computer, a machine, a laptop, a portable digital assistant (PDA), a staartphone, a mobile communication device, a cellular phone, a messaging device, a wireless device, a server, and a network.

4. The system of claim 1, wherein a threat is isolated based on at least one of a user identity and a device identity.

5. The system of claim 1, wherein a threat is isolated based upon a messaging protocol that initially contained the threat.

6. The system of claim 1, further comprising a policy engine that implements the security measure independent of messaging protocol.

7. The system of claim 1, further comprising a scanning engine that evaluates data associated with the first and second communication sessions utilizing at least one of the following types of filters: an anti-spam filter, an AV (Anti-Virus) filter, a URL (Universal Resource Locator) filter, a URI (Uniform Resource Identifier) filter, a content analysis, a compliance filter, and an authentication filter.

8. The system of claim 1, further comprising a common data store that stores data related to at least one of an active communication session and a past communication session.

9. The system of claim 8, the common data store includes an identity involved in the first communication session including at least one of an email address, an IP address, an instant messaging handle, and a URI (Uniform Resource Identifier) including a SIP (Session Initiation Protocol) type URI.

10. The system of claim 8, the MSD component utilizes the active communication session data to employ dynamic evaluation and implementation of the security measure to at least one messaging protocol.

11. The system of claim 8, the MSD component utilizes the past communication session data to employ the security measure to at least one messaging protocol.

12. The system of claim 1, the MSD component identifies a source of wherein a threat, the source is at least one of a device, a user, a gaming device, a computer, a machine, a laptop, a portable digital assistant (PDA), a smartphone, a mobile communication device, a cellular phone, a messaging device, an IP address, a website, an attachment associated with an email, a wireless device, a server, a portable media device, a person, an identity, a persona, a characteristic of the threat, a type of the threat, and a network.

13. The system of claim 12, the MSD component further identifies the persona corresponding to the source and associated with a messaging protocol, the persona is at least one of an email address, an IP telephony number, an instant messaging handle, an Internet Protocol (IP) address, a URI (Uniform Resource Identifier) including a SIP (Session Initiation Protocol) URI, a web mail address, and a facsimile number.

14. The system of claim 1, further comprising a repair component that initiates a mechanism that corrects an infected entity that becomes infected as a function of a threat.

15. The system of claim 14, the repair component utilizes a messaging protocol that is disparate in comparison with the infected messaging protocol to notify the infected entity wherein the notification includes the mechanism that corrects the infected entity.

16. A method, comprising:
    analyzing data related to a first and a second communication session involving electronic messages, each communication session corresponding to a disparate messaging protocol;
    identifying, using a computer processor, a first user identifier corresponding to the first communication session and a second user identifier corresponding to the second communication session, wherein the second communication session is in a messaging protocol different than the first communication session;
    determining that the first user identifier and the second user identifier correspond to two personas of a single user; and
    enforcing a security policy on the single user to at least two or more messaging protocols based on an evaluation of the two personas.

17. The method of claim 16, the first communication session relates to a device, the device is at least one of a computer, a machine, a laptop, a portable digital assistant (PDA), a smartphone, a mobile communication device, a cellular phone, a gaming device, a portable media device, a messaging device, a wireless device, a server, and a network.

18. The method of claim 16, further comprising:
    identifying a source of a threat;
    generating a security policy as a function of the threat; and
    enforcing the security policy to at least two or more messaging protocols.

19. The method of claim 16, further comprising:
    utilizing a messaging protocol to communicate repair data related to a threat;
    analyzing at least one of a past and an active communication session; and
    implementing the security policy to at least two messaging protocols based on the analysis of the past and the active communication session.

20. A router, comprising:
    an interface of a computer processor for receiving data related to a communication session; and
    a messaging security device (MSD) component of the computer processor for dynamically evaluating the data related to a first and a second communication session involving electronic messages, each communication session corresponding to a disparate messaging protocol, identifies a first user identifier corresponding to the first communication session and a second user identifier corresponding to the second communication session, wherein the messaging protocol of the second communication session is different than the messaging protocol of the first communication session, determines that the first user identifier and the second user identifier correspond to two personas of a single user, enables a security measure for preventative monitoring of the single user, and universally applies the security measure to the disparate messaging protocols of the single user.

21. The system of claim 1, wherein the identifying includes examining user identifications specified in Simple Mail Transfer Protocol (SMTP) to tie data to an owner of a machine or device.

22. The system of claim 1, wherein the identifying includes examining user identifications specified in Post Office Protocol (POP) to tie data to an owner of a machine or device.

23. The system of claim 1, wherein the identifying includes examining user identifications specified in Internet Message Access Protocol (IMAP) to tie data to an owner of a machine or device.

24. The system of claim 1, wherein the identifying includes examining user identifications specified in Messaging Application Programming Interface (MAPI) to tie data to an owner of a machine or device.

25. The system of claim 1, wherein the dynamically evaluating includes deriving a reputation score for the user.

26. The system of claim 1, wherein the dynamically evaluating includes sniffing public instant messaging traffic.

27. The system of claim 1, wherein the messaging protocol of the first communication session is a protocol of a first company and the messaging protocol of the second communication session is a protocol of a second company different than the first company.

28. The system of claim 1, wherein the dynamically evaluating includes obtaining user identifications associated with the first communication session and the second communication session and querying a directory using the user identifications to determine that the user identifications are both associated with a single user.

29. The system of claim 1, wherein the dynamically evaluating includes monitoring log-in information to a service provider and matching user identifications associated with the first communication session and the second communication session with the same log-in information, the log-in information being log-in information for the single user.

* * * * *

UNITED STATES PATENT AND TRADEMARK OFFICE
CERTIFICATE OF CORRECTION

PATENT NO. : 8,484,733 B2
APPLICATION NO. : 11/563730
DATED : July 9, 2013
INVENTOR(S) : Pirzada et al.

Page 1 of 1

It is certified that error appears in the above-identified patent and that said Letters Patent is hereby corrected as shown below:

In the Claims:

In column 19, line 33, in claim 3, delete "staartphone," and insert --smartphone,--, therefor In column 19, line 47, in claim 7, delete "Unifbrm" and insert --Uniform--, therefor Signed and Sealed this
Nineteenth Day of November, 2013

Teresa Stanek Rea
*Deputy Director of the United States Patent and Trademark Office*